Oct. 31, 1944.  G. H. RABA ET AL  2,361,708
DEVICE FOR PEDALING BY TWO PERSONS SPECIALLY ADAPTABLE TO BICYCLES
Filed Oct. 21, 1941
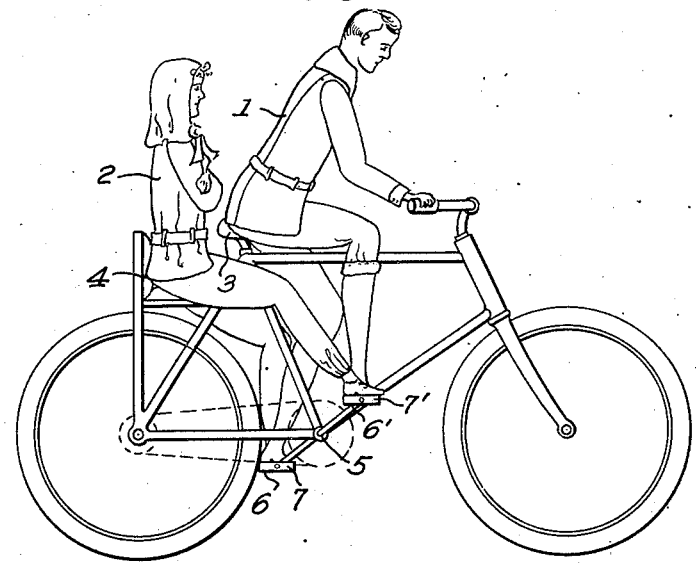
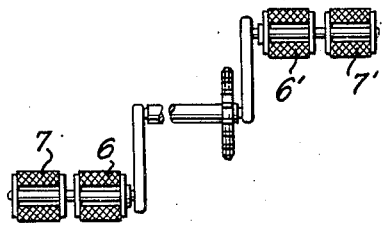
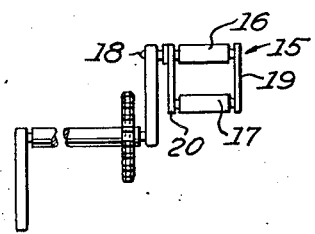
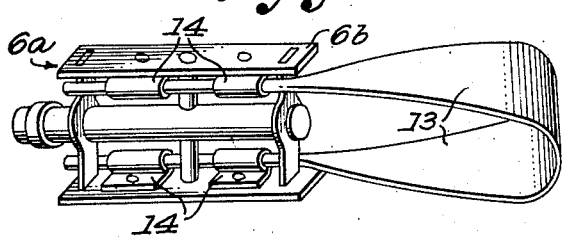
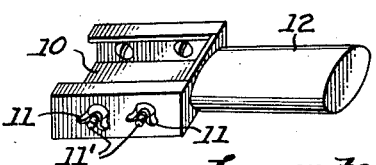
Inventors
GEORGES HENRIQUES RABA
ALICE HENRIQUES RABA
By Attorney.

Patented Oct. 31, 1944

2,361,708

UNITED STATES PATENT OFFICE 2,361,708

DEVICE FOR PEDALING BY TWO PERSONS, SPECIALLY ADAPTABLE TO BICYCLES

Georges Henriques Raba and Alice Henriques Raba, Sanary, France; vested in the Alien Property Custodian Application October 21, 1941, Serial No. 415,874
In France September 3, 1940

3 Claims. (Cl. 74—594.4)

This invention relates to two seater bicycles which are made up of ordinary bicycles with additional gear for seating a second rider capable of contributing to the pedaling of the first or normal rider.

The main object of our invention is to produce a bicycle which accommodates not only a single rider, but without much extra weight of structure also has sufficient seating and pedaling equipment for a second rider immediately behind the first or single rider.

Another object is to provide an ordinary bicycle with an attached auxiliary seat and auxiliary pedal treads for accommodating the second rider without reconstructing the bicycle or even interfering with its normal structure and operation.

A further object is to have such an equipped two seater bicycle which is substantially as light and quite as manageable by a single rider as it was before being equipped with the second seat and the auxiliary pedal treads.

Other objects and the various advantages inherent in our invention and accruing from its actual application in practice will appear more fully in detail as this specification proceeds.

In order to set forth more clearly the features and details of this invention in comprehensive manner, certain approved forms thereof are illustrated in the accompanying drawing forming part hereof, and in which, Fig. 1 is a side elevation of a bicycle equipped according to the invention and showing the operative positions of two riders thereon.

Fig. 2 illustrates a form of pedals used in the bicycle of Fig. 1, provided with auxiliary pedal treads according to the invention.

Fig. 3 is a modification of the pedals in Figure 2.

Fig. 4 is a perspective view of a pedal attachment intended for each pedal.

Fig. 5 illustrates yet another pedal attachment as actually applied to the pedal of a bicycle.

Throughout the views the same references indicate the same or like parts.

The conventional tandem bicycle while not a very familiar sight is nonetheless sufficiently common to bring out certain disadvantages despite the fact that it has two seats, two sets of pedals and usually two sets of handle bars for accommodating two riders simultaneously. Two other disadvantages are, first, that the wheel base and frame are considerably longer than on an ordinary bicycle for a single rider, while the construction is naturally heavier and more expensive. The second is that in case only one rider would desire to use the vehicle, it is rather too heavy and unmanageable for said rider alone in the absence of the other rider. It is likewise true that such a tandem bicycle occupies more space and is more difficult to store and to take out into service than is the case with an ordinary bicycle.

In order to overcome such disadvantages and several others as well, and incidentally include a group of new advantages, it is now proposed to attach to an ordinary bicycle a rear seat for a second rider and to equip the pedals of the bicycle with auxiliary pedals which will accommodate the feet of the second rider so that he may contribute to the operation of the vehicle as a whole. Hence, referring now again to the drawing, the rider indicated at 1 in Figure 1 is seated upon the conventional bicycle seat 3 in the conventional manner, while his feet rest upon the pedals 6, 6' in order to propel the bicycle, certain details of the latter being merely indicated, as the bicycle itself forms no actual part of the invention, but merely constitutes a vehicle for the same suffice it to state that the bicycle is of conventional construction and wheel base and normally would have no accommodations whatever for any other rider than shown at 1. However, in order to equip the bicycle with means for supporting a second rider, a seat 4 is secured to the frame of the bicycle behind seat 3, and at a lower level so that the legs of the second rider can straddle the rear part of the frame with the feet engaging upon the auxiliary pedals or pedal treads 7, 7' which are actually extensions of the pedals 6, 6' previously mentioned. In other words, each pedal 6 or 6' will be coaxial and mounted upon the same spindle with the corresponding adjacent auxiliary pedal or pedal tread 7, 7' respectively, so that two feet can engage the pedals side by side at each side of the vehicle, this relation of the pedals being best shown in Figure 2.

Another manner of attaching auxiliary pedals is quite evident upon inspecting the detachable pedal or pedal tread 12 in Figure 4, wherein the left end virtually forms a clamp 10 which can be slid over such a pedal 6—a as illustrated in Fig. 5, and the wing-nuts 11 on bolts 11' passed through the treads 6—b of pedal 6—a, then tightened with the result that the pedal 12 will form an axial extension beyond pedal 6—a.

Furthermore, as shown in Figure 5 the pedal 6—a may be provided with a metal stirrup 13, which is U-shaped and has the two branches thereof supported from the near side in one case and from the far side in the other case upon said pedal, these branches being passed through rings 14, 14 secured to the sides of the pedal by means of small bolts or other known means. According to this device, the plane of the stirrup makes with the plane of the pedal an angle, which substantially corresponds to the angle made by the two cyclists, with the crankgear as apex. In order to compensate the angle made by a wider opening of the cyclist's legs, the stirrup will preferably have its projecting part bent upwardly as shown in said Figure 5.

While in the foregoing it has been set forth that the feet of the second cyclist or rider can operate pedals outside of the feet and pedals of the first cyclist or rider, it may sometimes be objectionable to have the vehicle present the extra width that is thus involved in its construction, because it will obviously be widened by the length of two pedals, one on each side. For this reason, it is also possible to have a dependent pedal generally indicated at 15 in Figure 3 consisting of the first or main pedal 16 riding on the spindle 18 and a second auxiliary pedal or pedal tread 17 connected to the first pedal by means of plates or links 19 and 20. In this case, the first rider will place his feet on the upper pedal tread 16, while the second rider will place his feet beneath on the lower pedals 17 with a result that the pedals will not extend to either side to any greater extent than single pedals for a single cyclist or rider.

It is to be noted that in view of the different positions of the two cyclists, although both operate the same or at least adjacent pedals, the efficient angle of operation of each is different than that of the other so that no dead center is actually present and the tendency to have a dead angle is greatly narrowed with the result that efficiency is greatly improved. This is particularly noticeable at low speeds and when ascending hills.

It is quite evident that the double pedaling apparatus as described above when applied to a bicycle can also be adapted for propulsion or operation by means of pedals, such as, pedal driven boats, bellows operated by pedals, foot-power operated machinery, and even tandem bicycles, which can thus be equipped to take three or four cyclists instead of the usual two.

The apparatus likewise makes it possible to produce machines of a new type, including the invention, having a minimum bulk weight and at a minimum cost, or else to equip existing machines which may require increased power input by adding the seat and double pedals according to the features of this invention.

Manifestly, other variations than those actually described may be resorted to and parts may be used without others within the scope of the appended claims.

Having now fully described our invention, we claim:

1. In a foot-power driven device, the combination of a shaft; two angularly opposite pedal cranks on said shaft; a spindle on each crank; a pedal rotatably mounted on each spindle; and a second pedal mounted for rotation about the axis of each spindle co-axially with the first pedal on the spindle.

2. In a foot-power driven device, the combination of a shaft; two angularly opposite pedal cranks on said shaft; a spindle on each crank; a pedal rotatably mounted on each spindle; a pair of casings adapted to be clamped on said pedals, respectively; and a pair of pedals so mounted on said casings respectively as to be disposed co-axially with the pair of pedals on the spindles, respectively, when the casings are clamped on the pedals.

3. In a foot-power driven device, the combination of a shaft; two angularly opposite pedal cranks on said shaft; a spindle on each crank; a pedal rotatably mounted on each spindle; and an auxiliary pedal mounted on each of said pedals, each auxiliary pedal comprising a U-shaped stirrup having its ends attached to the pedal on the spindle and its bight extending axially thereof.

ALICE HENRIQUES RABA.
GEORGES HENRIQUES RABA.